US010129764B2

(12) United States Patent
Yu et al.

(10) Patent No.: US 10,129,764 B2
(45) Date of Patent: Nov. 13, 2018

(54) REFERENCE SIGNAL PROVISIONING AND CHANNEL INFORMATION REPORTING FOR WIRELESS DIRECTIONAL TRANSMISSION SYSTEMS

(71) Applicant: MEDIATEK INC., Hsinchu (TW)

(72) Inventors: Chia-Hao Yu, Yilan County (TW); Jiann-Ching Guey, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/607,369

(22) Filed: May 26, 2017

(65) Prior Publication Data
US 2017/0347276 A1    Nov. 30, 2017

Related U.S. Application Data

(60) Provisional application No. 62/343,041, filed on May 30, 2016.

(51) Int. Cl.
  *H04B 17/00*  (2015.01)
  *H04W 16/28* (2009.01)
  *H01Q 3/26*  (2006.01)
  *H04L 5/00*  (2006.01)

(52) U.S. Cl.
  CPC ......... *H04W 16/28* (2013.01); *H01Q 3/2635* (2013.01); *H04L 5/0053* (2013.01)

(58) Field of Classification Search
  CPC ....... H04W 16/28; H01Q 3/2635; H01Q 3/24; H01Q 3/26; H04L 5/0053
  USPC ........ 455/434, 450, 464, 67.11, 115.1, 226.1
  See application file for complete search history.

(56) References Cited

U.S. PATENT DOCUMENTS

| | | | | |
|---|---|---|---|---|
| 6,201,802 B1* | 3/2001 | Dean | ................ | H04W 56/001 370/328 |
| 7,885,288 B2* | 2/2011 | Kent | ................ | H04B 7/0848 370/464 |
| 8,311,027 B2* | 11/2012 | Padovani | ............... | H04B 7/264 370/328 |
| 8,401,546 B2* | 3/2013 | Landry, Jr. | ............. | G01S 19/24 342/357.2 |
| 2007/0135051 A1* | 6/2007 | Zheng | ............... | H04B 7/18513 455/63.1 |
| 2012/0202418 A1* | 8/2012 | Jalali | ................ | H01Q 1/2291 455/15 |

\* cited by examiner

*Primary Examiner* — Sonny Trinh
(74) *Attorney, Agent, or Firm* — Imperium Patent Works; Zheng Jin

(57) ABSTRACT

Mechanisms for wireless directional transmission systems are proposed. In a first novel aspect, a mechanism for reference signal provisioning and channel information reporting is proposed. Two sets of measurement pilots are introduced for initial access and control signaling. In a second novel aspect, a beamwidth adaptation mechanism is proposed to deal with occasional channel variation without requiring constantly high overhead due to measurement pilot transmission. In a third novel aspect, a mechanism for backhaul link to activate/deactivate efficiently is proposed. New states of activated state and deactivated state are introduced.

22 Claims, 13 Drawing Sheets

REFERENCE SIGNAL PROVISIONING AND CHANNEL INFORMATION REPORTING FOR WIRELESS DIRECTIONAL TRANSMISSION SYSTEMS

CROSS REFERENCE TO RELATED APPLICATIONS

This application claims priority under 35 U.S.C. § 119 from U.S. Provisional Application No. 62/343,041 entitled "Beamwidth Adjustment Mechanism for Channel Variation Reduction," filed on May 30, 2016; the subject matter of which is incorporated herein by reference.

TECHNICAL FIELD

The disclosed embodiments relate generally to wireless directional transmission systems, and, more particularly, to reference signal provisioning and channel information reporting in a Millimeter Wave (mmW) beamforming system.

BACKGROUND

The bandwidth shortage increasingly experienced by mobile carriers has motivated the exploration of the underutilized Millimeter Wave (mmWave) frequency spectrum between 30 G and 300 G Hz for the next generation broadband cellular communication networks. The available spectrum of mmWave band can be up to hundreds of times greater than the conventional cellular system. The mmWave wireless network uses directional communications with narrow beams and can support multi-gigabit data rate. The underutilized bandwidth of the mmWave spectrum has wavelengths in the order of millimeter, thus the name. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

The backhaul link in mmWave backhaul systems has the following characteristics: 1) very high directivity transmission; 2) limited dominant paths (either LOS or NLOS). In principle, beam training mechanism, which includes both initial beam alignment and subsequent beam tracking, ensures that a Hub and Stations that can be served by the Hub are aligned for data communication. At least for initial network access, measurement pilot transmission at the Hub is needed. Consideration for providing measurement pilot opportunities in downlink includes: blanket-scan the high-directivity beams for full angular coverage; beams are time division multiplexed and multiple TRX chains can reduce the required time for one blanket-scan. It has been observed that full beamformed channel matrix (a.k.a. profile matrix) collection is time-consuming, especially if Station-side beamforming is applied as well. In addition, channel sparsity implies that the number of meaningful elements in the profile matrix is limited. A mechanism for provisioning of measurement pilots for beam alignment and for channel state information collection is sought.

Typical channel variation sources for the backhaul link in mmWave backhaul systems include: 1) mounting pole movement due to wind sway; 2) partial blockage of first Fresnel zone; 3) environmental changes (temperature, air density). Specifically, wind sway is the main variation source for the backhaul link as compared to other variation sources. Although wind-induced channel variation can be tackled by increasing the time-domain density of measurement pilots, it may result in over-designed pilot density. Furthermore, pilot transmission is accompanied by whole bandwidth allocation, the addition pilots may not be used efficiently with high overhead. A mechanism for reducing channel variation with beamwidth adaptation is sought.

In mmWave backhaul environment, static stations render the importance of mobility support. For wireless communication systems with high directivity transmission, e.g., mmWave system, FDM among users may not be possible. Due to narrow beam nature, users with similar spatial signature is not a usual case. Users are more often served in TDM manner with whole BW. Small packet transmission is thus extremely inefficient. For power and resource saving, it is sensible to deactivate STA's backhaul link whenever possible. With the existing RAN mechanism, STA switching between RRC Idle and Connected states for power and resource saving. However, such transition is time and resource consuming, from the perspective of high-directivity transmission, e.g., mmWave system. First, contention-based random access may include conflict resolution. Second, establishing RRC connection requires several rounds of signaling between Hub and STA. Third, each transmission is provided with whole BW. A mechanism to activate/deactivate STA backhaul link efficiently is sought.

SUMMARY

Mechanisms for wireless directional transmission systems are proposed. In a first novel aspect, a mechanism for reference signal provisioning and channel information reporting is proposed. Two sets of measurement pilots are introduced for initial access and control signaling. In a second novel aspect, a beamwidth adaptation mechanism is proposed to deal with occasional channel variation without requiring constantly high overhead due to measurement pilot transmission. In a third novel aspect, a mechanism for backhaul link to activate/deactivate efficiently is proposed. New states of activated state and deactivated state are introduced.

In one embodiment, a wireless station (STA) performs measurements over a first set of pilots (Set-A pilots) associated with a first set of beams from a Hub in a directional transmission system. The Set-A pilots has a longer periodicity and provides full coverage. The STA reports a first channel state information (CSI-1) to the Hub based on Set-A pilot measurements and CSI-1 reporting configuration. The STA performs measurements over a second set of pilots (Set-B pilots) associated with a second set of beams. The Set-B pilots has a shorter periodicity and provides partial coverage. The Set-B pilots is determined based on CSI-1 reporting. The STA reports a second CSI (CSI-2) to the Hub based on Set-B pilot measurements and CSI-2 reporting configuration.

In another embodiment, a Hub transmits a first set of pilots (Set-A pilots) associated with a first set of beams to a wireless station (STA) in a directional transmission system. The Set-A pilots has a longer periodicity and provides full coverage. The Hub receives a first channel state information (CSI-1) from the STA based on Set-A pilot measurements and CSI-1 reporting configuration. The Hub transmits a second set of pilots (Set-B pilots) associated with a second set of beams from the Hub to the STA. The Set-B pilots has a shorter periodicity and provides partial coverage. The Set-B pilots is determined based on CSI-1 reporting. The Hub receives a second CSI (CSI-2) from the STA based on Set-B pilot measurements and CSI-2 reporting configuration.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
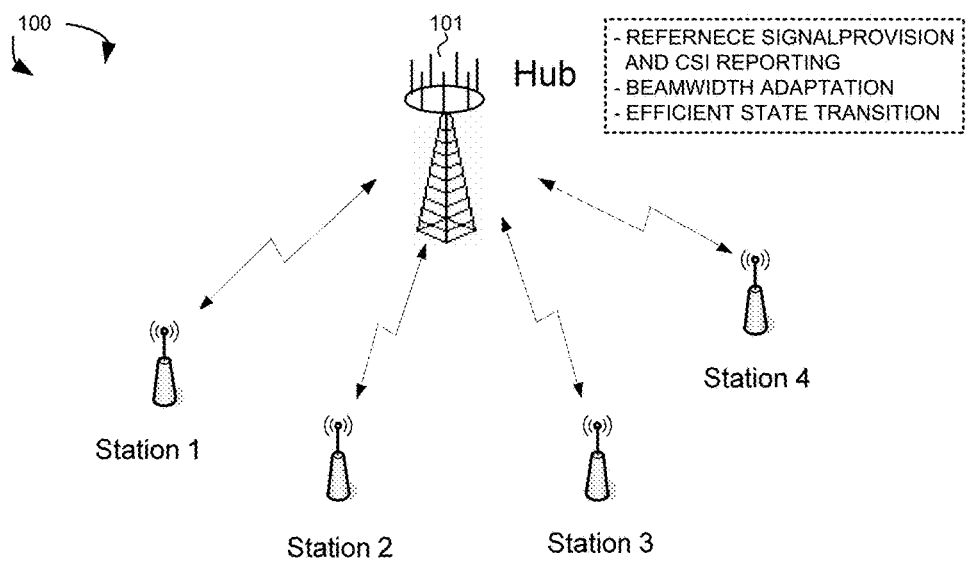
FIG. 1 illustrates a beamforming Millimeter Ware (mmWave) wireless communication system with reference signal provisioning, beamwidth adaptation, and efficient state transition in accordance with novel aspects of the current invention.

FIG. 1 illustrates a beamforming Millimeter Ware (mmWave) wireless communication system 100 with reference signal provisioning, beamwidth adaptation, and efficient state transition in accordance with novel aspects of the current invention. Beamforming mmWave mobile communication network 100 comprises a backhaul Hub 101 and a plurality of Stations (STAs) 1-4. The mmWave cellular network uses directional communications with narrow beams and can support multi-gigabit data rate. Directional communication is achieved via digital and/or analog beamforming, where multiple antenna elements are applied with multiple sets of beamforming weights to form multiple beams. In the example of FIG. 1, it is assumed that beamforming capability at least at Hub side, e.g. a set of beamformers whose aggregate spatial coverage defines desired service area. Beamforming capability at STA side is possible a well. Each STA continuously monitors channel in active mode, which is defined as a state with expectation of traffic exchange between Hub and STA. Hub 101 is directionally configured with multiple sets of beamforming weights to form backhaul links to communicate with STAs 1-4.

The backhaul link in mmWave backhaul systems has the following characteristics: 1) very high directivity transmission; 2) limited dominant paths (either LOS or NLOS). In principle, beam training mechanism, which includes both initial beam alignment and subsequent beam tracking, ensures that the Hub and the Stations are aligned for data communication. In accordance with novel aspects of the current invention, first, a mechanism for reference signal provisioning and channel information reporting is proposed. Two sets of measurement pilots are introduced for initial access and control signaling. Second, a beamwidth adaptation mechanism is proposed to deal with occasional channel variation without requiring constantly high overhead due to measurement pilot transmission. Third, a mechanism for backhaul link to activate/deactivate efficiently is proposed. New states of activated state and deactivated state are introduced.

Figure 2:
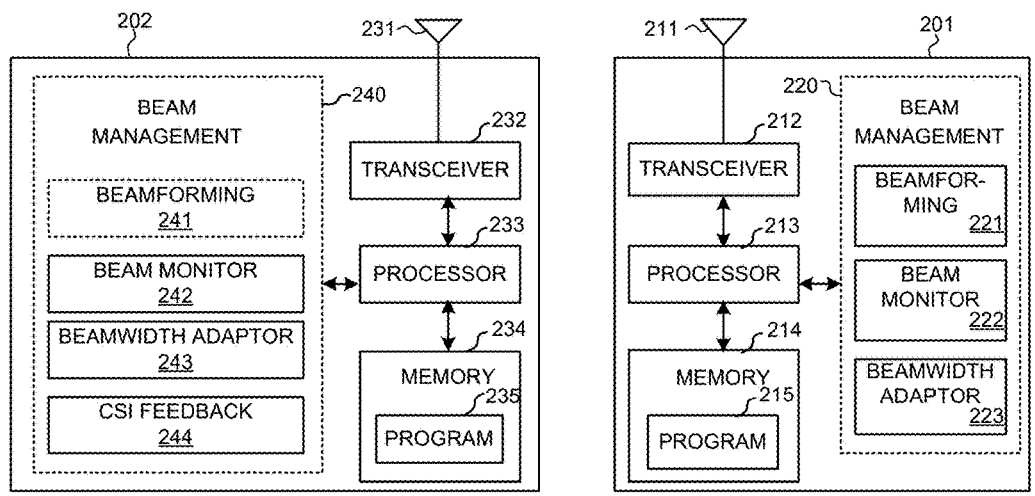
FIG. 2 is a simplified block diagram of a backhaul hub and a base station that carry out certain embodiments of the present invention.

FIG. 2 is a simplified block diagram of a Hub 201 and an STA 202 that carry out certain embodiments of the present invention. Hub 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules and circuits to perform features in Hub 201. Memory 214 stores program instructions and data 215 to control the operations of Hub 201. Hub 201 also includes multiple function modules and circuits that carry out different tasks in accordance with embodiments of the current invention.

Similarly, STA 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules and circuits to perform features in STA 202. Memory 234 stores program instructions and data 235 to control the operations of STA 202. STA 202 also includes multiple function modules and circuits that carry out different tasks in accordance with embodiments of the current invention.

The functional modules and circuits can be implemented and configured by hardware, firmware, software, and any combination thereof. For example, Hub 201 comprises a beam management module 220, which further comprises a beamforming circuit 221, a beam monitor 222, and a beamwidth adaptor 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Beamwidth adaptor 223 determines to apply narrow beam mode or wide beam mode to deal with occasional channel variation.

Similarly, STA 202 comprises a beam management module 240, which further comprises a beamforming circuit 241, a beam monitor 242, a beamwidth adaptor 243, and a CSI feedback circuit 244. Beamforming circuit 241 may belong to part of the RF chain, which applies various beamforming weights to multiple antenna elements of antenna 231 and thereby forming various beams. Beamforming circuit 241 is optional for STA side, because STA 202 can use omni beam instead. Beam monitor 242 monitors received radio signals and performs measurements of the radio signals over the various beams. Beamwidth adaptor 243 switches between narrow beam mode and wide beam mode to deal with occasional channel variation. CSI feedback circuit 244 provide channel state information to Hub 201 for beam alignment status determination.

Figure 3:
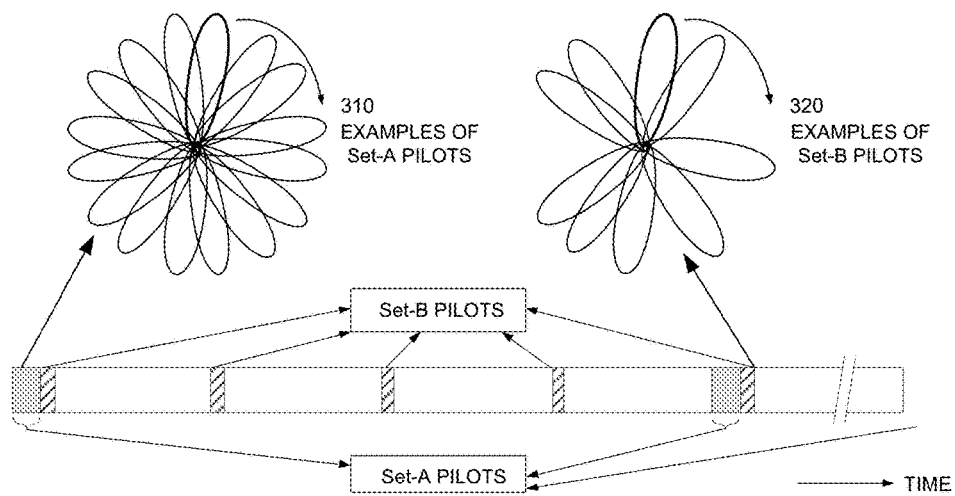
FIG. 3 illustrates two sets of measurement pilots to facilitate access channel and static channel in mmWave wireless communication systems.

FIG. 3 illustrates two sets of measurement pilots to facilitate access channel and static channel in mmWave wireless communication systems. There are different channels to be allocated for wireless communication. An access channel is allocated at least for initial access, a static channel is allocated at least for control signaling and small traffic, and a dynamic channel is allocated at least for carrying dedicated user traffic. For beamforming mmWave systems, two sets of measurements pilots are provisioned for beam alignment and for channel state information (CSI) collection. Set-A pilots provides blanket-scan coverage that is matched to access channel, but its periodicity is too long to trace short term channel variation. Set-B pilots provides partial aggregated spatial angular coverage that is matched to static channel, and with its periodicity short enough to trace channel variation. Set-A is used for acquiring profile matrix for individual STAs. STAs report CSI-1 to indicate meaningful elements in corresponding profile matrices. Based on profile matrices, Hub decides Set-B pilots. Individual STAs report CSI-2 back to Hub. CSI-2 reporting can either be full set-B pilot report or selected set-B pilot report.

In the example of FIG. 3, Set-A measurement pilots is provisioned with long periodicity, which provides not enough opportunities for tracing channel variation. As depicted by 310, individual pilots are transmitted with different beamformers. The aggregated spatial angular coverage of the beamformers covers the desired service area. Preferably, the different beamformers possess similar spatial resolution. Set-B measurement pilots is provisioned with short periodicity. The short periodicity provides pilot periodicity short enough to trace short term channel variation. As depicted by 320, individual pilots are transmitted with different beamformers. The aggregated spatial angular coverage of the beamformers covers only partial desired service area. Set-B pilots adaptation can be signaled via broadcasting or dedicated signaling. Within a Set-A or Set-B time span, individual pilots are transmitted by different beamformers in a TDM manner. If Hub is equipped by multiple transceiver chains, then it could enable simultaneous transmission of multiple beamformers.

Figure 4:
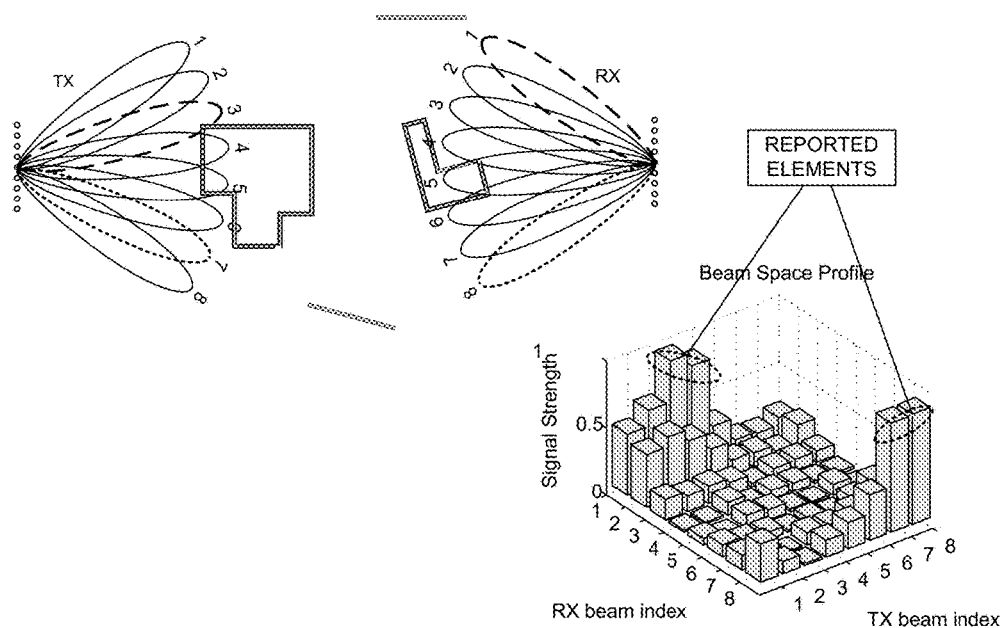
FIG. 4 illustrates channel response matrix (profile matrix) representing signal strength of all TX beam and RX beam combination and CSI1 reporting.

FIG. 4 illustrates channel response matrix (profile matrix) representing signal strength of all TX beam and RX beam combination and CSI-1 reporting. The Set-A pilots provides opportunities for STA to learn their individual profile matrices, which can be traced simply by Set-A if channel variation is manageable in a few Set-A pilot periods. As depicted in FIG. 4, there are 8 TX beams and 8 RX beams, the profile matrix indicates the signal strength of all TX beam and RX beam combination. CSI-1 is based on the profile matrix, which in turn is based on the measurement results of Set-A pilots, with a reporting periodicity no shorter than Set-A periodicity. In another embodiment, the reporting periodicity is long enough to allow updating information in profile matrix. However, full profile matrix feedback may introduce unbearable overhead. Therefore, it is possible to report only meaningful TX beam and RX combinations, e.g., with the strongest signal strengths, as depicted in FIG. 4.

There are different options for CSI-1 report. In a first option, the strongest-N report with fixed overhead length is used, where strongest N elements' RSRP/RSRQ and their indices are fed back. In a second option, threshold-based report with variable overhead length is used, where elements whose RSRP/RSRQ is larger than a threshold are fed back, together with their indices. In a third option, hybrid of strongest-N and threshold-based report can be used. Among strongest N elements, the ones with RSRP/RSRQ larger than a threshold are fed back. Note that Hub and STA should have a common understanding about the indices to profile matrix. For example, the number of Hub beams can be carried in a broadcast channel. The number of STA beams, i.e., STA beamforming capability, may need to be signaled to Hub as well.

Figure 5:
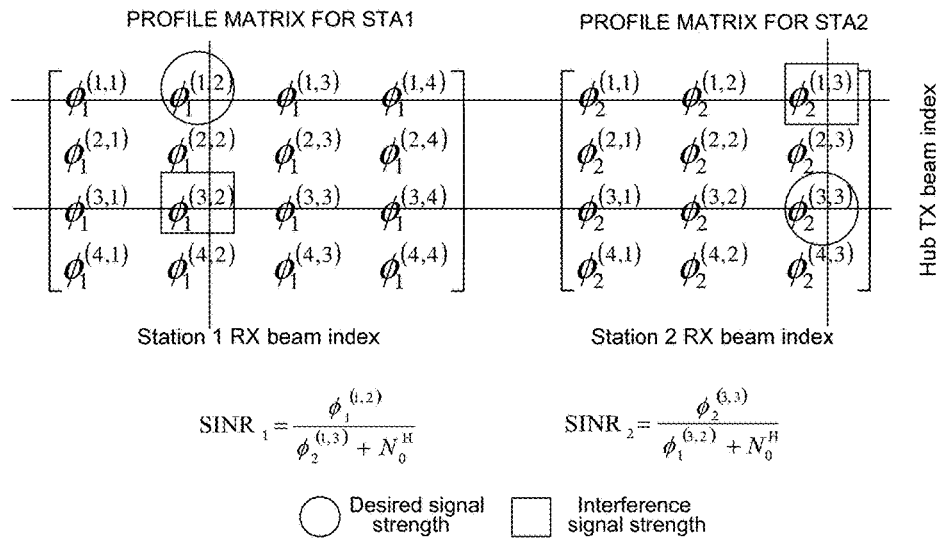
FIG. 5 illustrates Hub behavior upon receiving CSI feedback from STA.

FIG. 5 illustrates Hub behavior upon receiving CSI feedback from STA. CSI-1 from individual STAs provides possible transmission paths toward individual STAs. Unused transmission paths may introduce interference to each other. While Hub decides transmission paths for individual STAs, interference paths are determined at the same time. A transmission path corresponds to a combination of TX beam and RX beam. For individual STAs, several transmission paths can be selected for, e.g., high-rank TX with multiple transceiver chains. As depicted in FIG. 5 for the downlink transmission, for STA1, the desired transmission path includes Hub transmits data on beam 1 and STA1 receives on beam 2, while the interference path includes Hub transmits data on beam 3 and STA1 receives on beam 2. For STA2, the desired transmission path includes Hub transmits data on beam 3 and STA2 receives on beam 3, while the interference path includes Hub transmits on beam 1 and STA2 receives on beam 3.

Once CSI-1 feedback is reported to Hub, Set-B pilots at least should be transmitted in the selected transmission paths. Immediate neighboring TX beams of the selected transmission paths can be included for beam adaptation, which is need to deal with channel variation caused by, e.g., mounting pole mechanic vibration, station mobility. Set-B pilots pattern may change. A change in selected transmission paths, which can be triggered by CSI-1 report, could cause a change in Set-B pilots. Changes to selected transmission paths can be cause by, e.g., STA entry, departure, or blockage. Set-B pilots pattern needs to be signaled to individual STAs. In a first option, Hub informs the whole Set-B pilots. In a second option, Hub informs relevant pilot pattern only. Irrelevant pilots include: the ones not included in CSI-1, or the ones included in CSI1 by show weak strength.

CSI-2 is based on the measurement results of Set-B pilots, with a reporting periodicity no shorter than the Set-B periodicity. In another embodiment, the reporting periodicity is long enough to allow updating information in profile sub-matrix. For individual STAs, CSI-2 measurement shall apply RX beams indicated by Hub. The #RX-beam-CSI for CSI-2 measurement can be bigger than #RX-beam-data for data reception. Extra Rx beam monitoring for, e.g., beam adaptation purpose. RX beams for CSI-2 measurement is a subset of all supported STA beams. Profile sub-matrix based on Set-B pilots is significantly smaller than profile matrix. For individual STAs, the profile sub-matrix size is (#Set-B-pilot*#RX-beam-CSI), and the profile matrix size is (#Set-A-pilot*#STA-beam), and #Set-A-pilot can be equivalent to #Hub-beam. CSI-2 reporting can be full sub-matrix report or can be reported similar to the options listed for CSI-1 report.

CSI-2 from individual STAs provides channel state information, which assists scheduling and link adaptation. CSI-2 also provides information for beam adaptation. For channel variation caused by mechanic vibration such as mounting pole sway, TX/RX beam change may be required to maintain proper link quality. Therefore, profile sub-matrix needs Set-B pilots to include neighboring TX beams of selected transmission paths.

Figure 6:
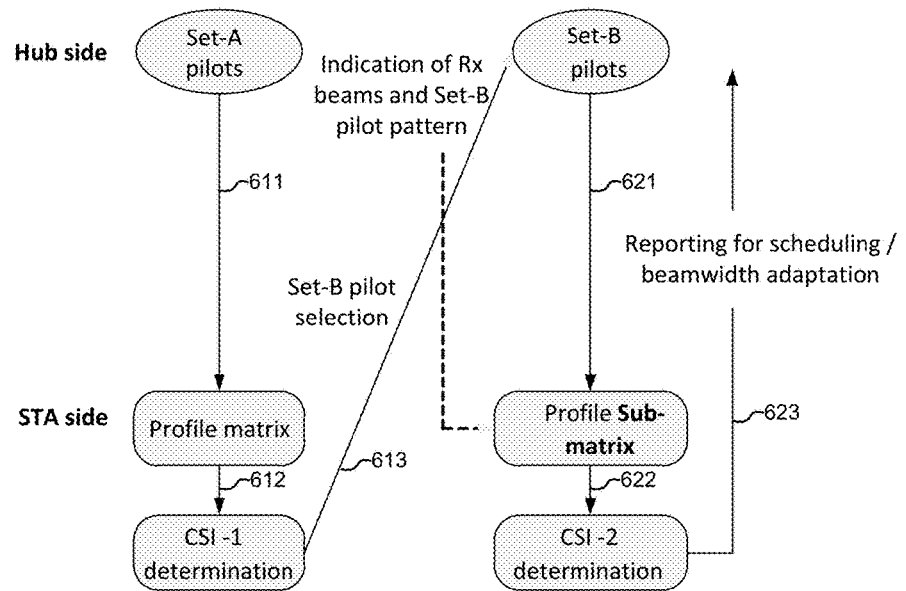
FIG. 6 illustrates the interaction between pilot and CSI reporting.

FIG. 6 illustrates the interaction between pilot and CSI reporting. Hub side first determines Set-A pilots and signals STA (step 611). STA performs pilot measurements for profile matrix and determines CSI-1 accordingly (step 612). CSI-1 is then reported to Hub side for Set-B pilot selection (step 613). Hub side next determines Set-B pilots and signals STA (step 621). STA performs pilot measurements for profile sub-matrix and determines CSI-2 accordingly (step 622). CSI-2 is then reported to Hub side for scheduling and beam adaptation (step 623).

CSI-1 is required for transmission path selection before any sensible transmission configuration. Therefore, it is sensible to have CSI-1 reporting configuration to rely on broadcast signaling for reporting the number of Hub beams and CSI-1 content. Initially, CSI-1 reporting is a-periodically triggered (e.g., along with initial access). CSI-1 report includes information of the number of STA beams so that Hub can learn the size of profile matrix and indices to matrix elements. Later on, CSI-1 report can be dedicated re-configured, for example, together with CSI-2 report configuration. Alternatively, capability signaling can take place after random access before CSI-1 reporting. Hub can learn the size of profile matrix, then CSI-1 report can be configured after capability signaling, and CSI-2 report can be configured as well.

Set-B pilot pattern is determined by Hub based on CSI-1. Set-B pilot pattern and CSI report should be configured to Stations. The content may include: 1) Set-B pilots to be transmitted and their time pattern. For individual Stations, they can either be provided with all information or only partial information that is relevant to them. The relevant ones are the strong ones in the corresponding profile matrix, and optionally the ones for beam adaptation purpose; 2) For individual Stations, the Station beams used for monitoring the Set-B pilots are indicated. As a result, the profile sub-matrix is defined based on the Station beams combined with Set-B pilots; 3) CSI reporting criteria/periodicity and reporting content. CSI can be, e.g., only the stronger ones in the profile matrix or profile sub-matrix.

Figure 7:
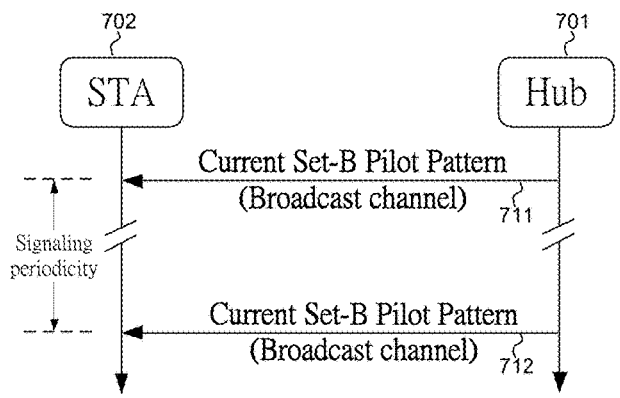
FIG. 7 illustrates a first embodiment of signaling for Set-B pilot and CSI configuration.

FIG. 7 illustrates a first embodiment of signaling for Set-B pilot and CSI configuration. In general, the configuration of Set-B pilots and CSI report can follow broadcast signaling or dedicated signaling. Different signaling implies different configuration content. In the example of FIG. 7, pure broadcast signaling is used—same message to all stations. In step 711, Hub 701 sends all Set-B pilots and time pattern information to all STAs over a broadcast channel. STAs may assume all station beams in their profile sub-matrices. The dimension of profile sub-matrix is larger. Simple CSI reporting configuration applies to all STAs, e.g., strongest-N report+STA beamforming capability. In step 712, Hub 701 broadcasts the current Set-B pilot pattern to all STAs after a signaling periodicity.

Figure 8:
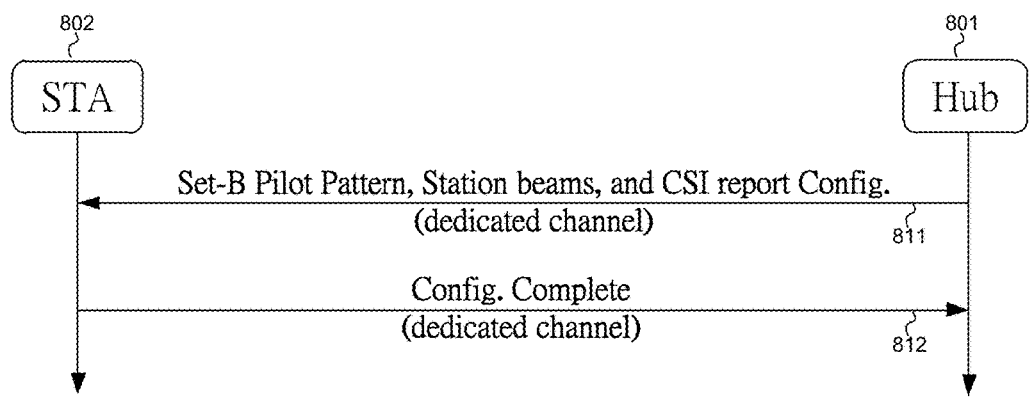
FIG. 8 illustrates a second embodiment of signaling for Set-B pilot and CSI configuration.

FIG. 8 illustrates a second embodiment of signaling for Set-B pilot and CSI configuration. In the example of FIG. 8, pure dedicated signaling is used—different message to individual stations. In step 811, Hub 801 sends dedicated pilots information and their time pattern to STA 802 over a dedicated channel. STA 802 can be signaled with simply its relevant pilot info. Alternatively, STA 802 can be signaled with all pilot info. STA 802 is signaled with beams used for monitoring the dedicated pilots. The STA beams are potentially different among different STAs. The dimension of profile sub-matrices is smaller. Potentially, the dimension of individual profile sub-matrices can be different. Individual CSI report is configured with periodicity, criteria, and content. In step 812, STA 802 sends a configuration complete message to Hub 801 over the dedicated channel.

Figure 9:
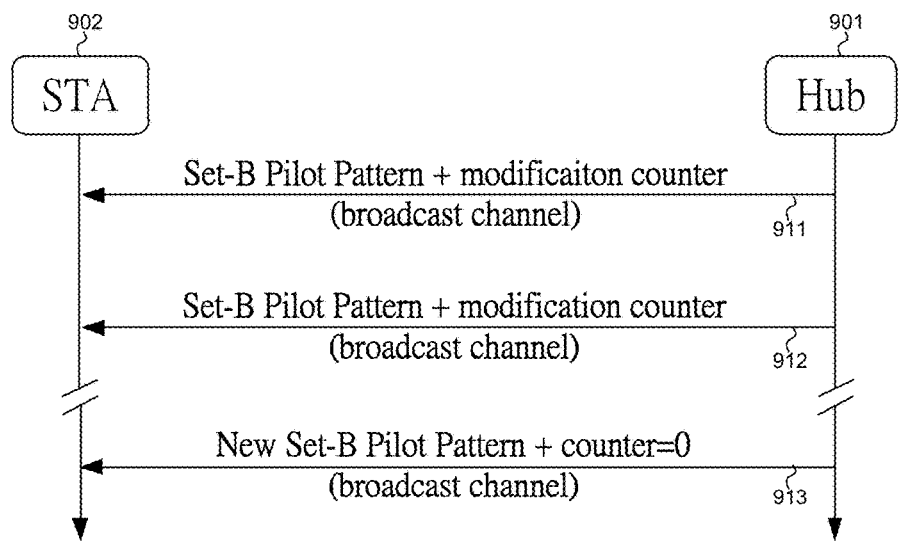
FIG. 9 illustrates a third embodiment of signaling for Set-B pilot and CSI configuration.

FIG. 9 illustrates a third embodiment of signaling for Set-B pilot and CSI reconfiguration. Reconfiguration may be needed due to a change in selected TX paths. The change can be caused by, e.g., STA arrival, departure, or blockage. The reconfiguration can be based on broadcast signaling. A sudden modification to dedicated pilot configuration may leave not enough time for STAs to adapt, a modification indication combined with a time-to-trigger counter fits better, modification latency is longer than dedicated signaling.

In the example of FIG. 9, Hub 901 broadcasts Set-B Pilot pattern plus modification counter to all stations.

Figure 10:
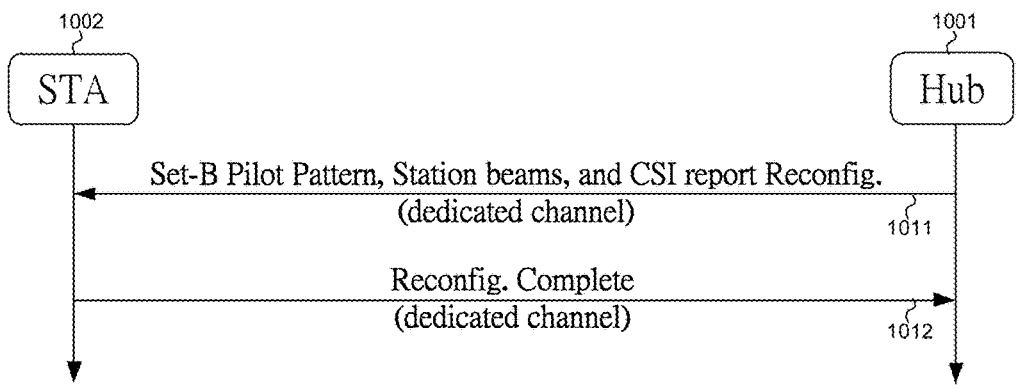
FIG. 10 illustrates a fourth embodiment of signaling for Set-B pilot and CSI configuration.

FIG. 10 illustrates a fourth embodiment of signaling for Set-B pilot and CSI reconfiguration. Reconfiguration may be needed due to a change in selected TX paths. The change can be caused by, e.g., STA arrival, departure, or blockage. The reconfiguration can be based on dedicated signaling. A fixed latency before applying new configuration can be applied. A change in Set-B pilots due to one STA may trigger reconfiguration of all or some STAs. This is because the changed Set-B pilots may be relevant to multiple STAs. The new Set-B pilots are signaled to all STAs, if all Set-B pilots information are configured to all STAs. CSI report reconfiguration may be needed as well. In the example of FIG. 10, in step 1011, Hub 1001 sends Set-B pilot pattern, station beams, and CSI report reconfiguration to STA 1002 over a dedicated channel. In step 1012, STA 1002 sends a reconfiguration complete message to Hub 1001 over the dedicated channel.

Figure 11A:
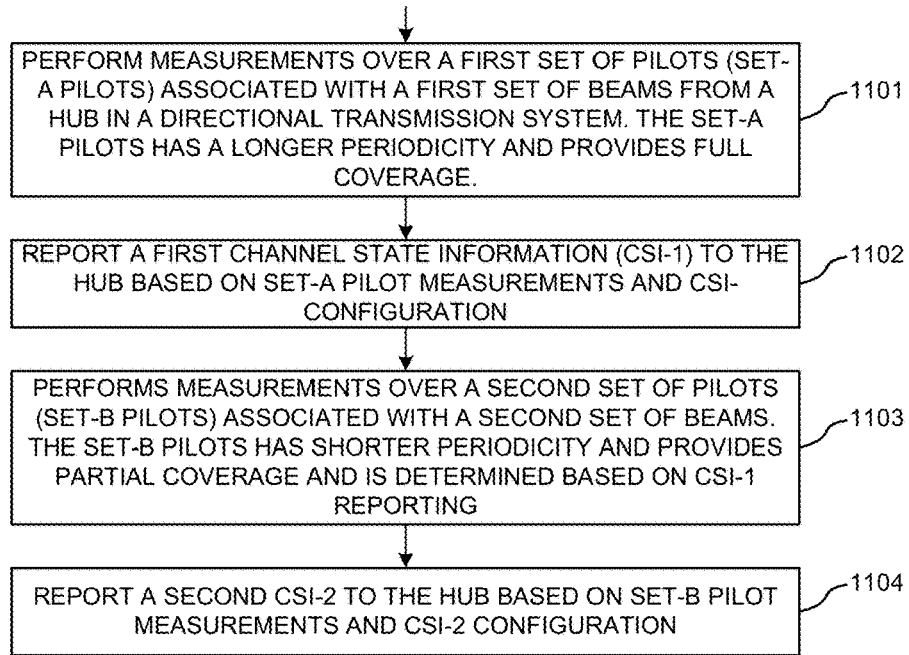
FIG. 11A is a flow chart of a method of reference signal provisioning and channel information reporting in mmWave wireless communication systems from STA perspective in accordance with one novel aspect.

FIG. 11A is a flow chart of a method of reference signal provisioning and channel information reporting in mmWave wireless communication systems from STA perspective in accordance with one novel aspect. In step 1101, a station (STA) performs measurements over a first set of pilots (Set-A pilots) associated with a first set of beams from a Hub in a directional transmission system. The Set-A pilots has a longer periodicity and provides full coverage. In step 1102, the STA reports a first channel state information (CSI-1) to the Hub based on Set-A pilot measurements and CSI-1 configuration. In step 1103, the STA performs measurements over a second set of pilots (Set-B pilots) associated with a second set of beams. The Set-B pilots has a shorter periodicity and provides partial coverage. The Set-B pilots is determined based on CSI-1 reporting. In step 1104, the STA reports a second CSI (CSI-2) to the Hub based on Set-B pilot measurements and CSI-2 configuration.

Figure 11B:
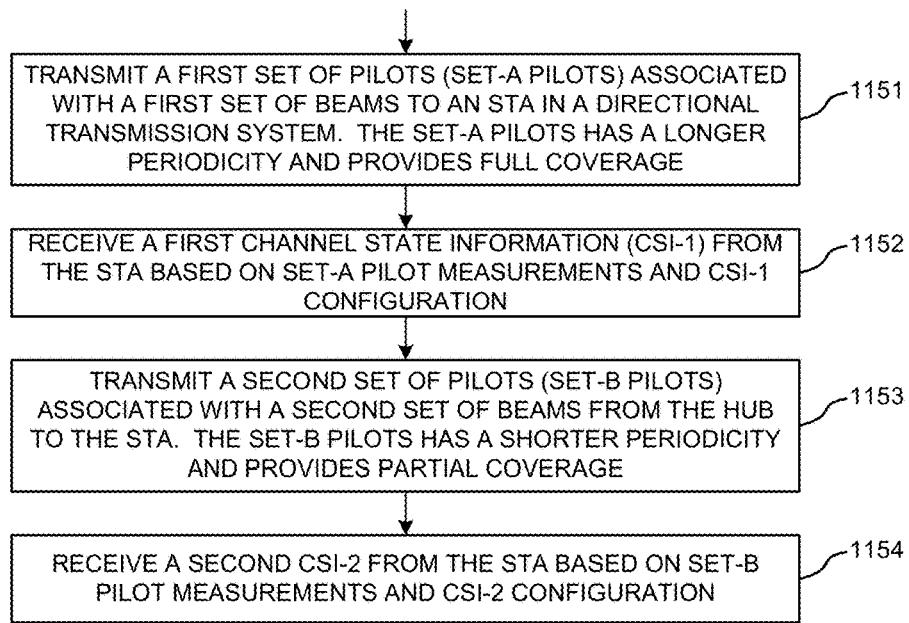
FIG. 11B is a flow chart of a method of reference signal provisioning and channel information reporting in mmWave wireless communication systems from Hub perspective in accordance with one novel aspect.

FIG. 11B is a flow chart of a method of reference signal provisioning and channel information reporting in mmWave wireless communication systems from Hub perspective in accordance with one novel aspect. In step 1151, a Hub transmits a first set of pilots (Set-A pilots) associated with a first set of beams to a wireless station (STA) in a directional transmission system. The Set-A pilots has a longer periodicity and provides full coverage. In step 1152, the Hub receives a first channel state information (CSI-1) from the STA based on Set-A pilot measurements and CSI-1 configuration. In step 1153, the Hub transmits a second set of pilots (Set-B pilots) associated with a second set of beams from the Hub to the STA. The Set-B pilots has a shorter periodicity and provides partial coverage. The Set-B pilots is determined based on CSI-1 reporting. In step 1154, the Hub receives a second CSI (CSI-2) from the STA based on Set-B pilot measurements and CSI-2 configuration.

Beamwidth Adjustment for Channel Variation Reduction

Figure 12:
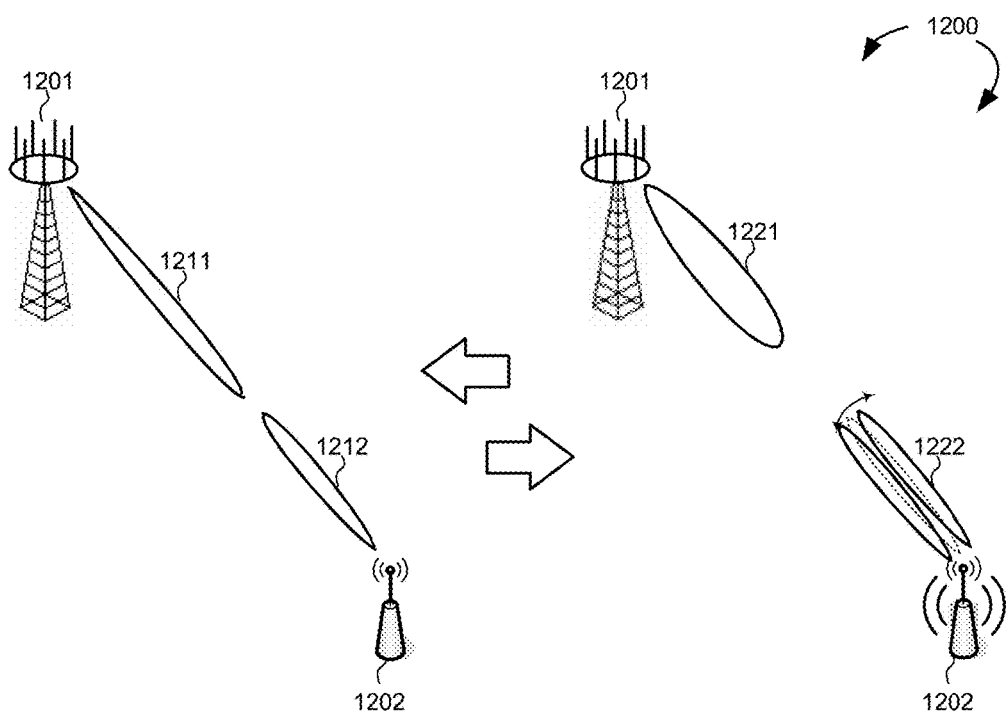
FIG. 12 illustrates a beamforming Millimeter Wave (mmWave) wireless communication system with beamwidth adaptation in accordance with one novel aspect.

FIG. 12 illustrates a beamforming Millimeter Wave (mmWave) wireless communication system 1200 with beamwidth adaptation to deal with occasional channel variation in accordance with one novel aspect. Beamforming mmWave mobile communication network 1200 comprises a backhaul Hub 1201 and a Station 1202. The mmWave cellular network uses directional communications with narrow beams and can support multi-gigabit data rate. Directional communication is achieved via digital and/or analog beamforming, wherein multiple antenna elements are applied with multiple sets of beamforming weights to form multiple beams. In the example of FIG. 12, Hub 1201 and Station 1202 are directionally configured with multiple sets of beamforming weights to form narrow beams to communicate with each other, e.g., Hub 1201 forms beam 1211 to communicate with narrow beam 1212 formed by Station 1202.

The backhaul link in mmWave backhaul systems has the following characteristics: 1) very high directivity transmission; 2) limited dominant paths (either LOS or NLOS). In principle, beam training mechanism, which includes both initial beam alignment and subsequent beam tracking, ensures that the Hub and the Stations are aligned for data communication. In mmWave systems, the transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to movements and environmental changes.

Typical channel variation sources for the backhaul link in mmWave backhaul systems include: 1) mounting pole movement due to wind sway; 2) partial blockage of first Fresnel zone; 3) environmental changes (temperature, air density). Specifically, wind sway is the main variation source for the backhaul link as compared to other variation sources. Although wind-induced channel variation can be tackled by increasing the time-domain density of measurement pilots, it may result in over-designed pilot density. Furthermore, pilot transmission is accompanied by whole bandwidth allocation, the addition pilots may not be used efficiently with high overhead.

In according with one novel aspect, a beamwidth adaptation mechanism is proposed to deal with occasional channel variation without requiring constantly high overhead due to measurement pilot transmission. Basically, when channel variation is severe, beam resolution is reduced to relieve signal to interference plus noise ratio (SINR) loss due to beam mis-alignment. As depicted in FIG. 12, when Station 1202 is static (e.g., beam 1212 is static), then narrow beam 1211 is formed by Hub 1201 to communicate with Station 1202 to achieve high data rate. When Station 1202 becomes a vibrating station (e.g., beam 1222 is vibrating due to wind sway) and channel variation becomes severe, then wider beam 1221 is formed by Hub 1201 to communicate with Station 1202 with slightly varying channel gain. If Hub 1201 continues to use narrow beam 1211, then beam mis-alignment could happen, which results in intermittent connection.

Figure 13:
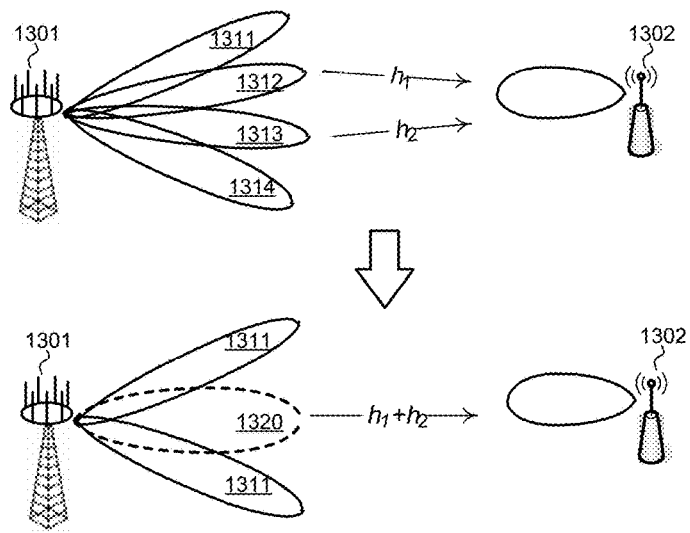
FIG. 13 illustrates single codebook approach for analog beamformers where wider beamwidth is constructed by aggregating multiple neighboring analog beams.

FIG. 13 illustrates single codebook approach for analog beamformers where wider beamwidth is constructed by aggregating multiple neighboring analog beams. Under single codebook design, all analog beamformers are applied with a single codebook for one fine resolution of narrow beam. Wider beamwidth is constructed by aggregating multiple neighboring analog beams, with the cost of applying individual transceivers for individual analog beams. Multiple transceivers are thus required at the Hub side, and the same data streams goes though the multiple transceivers. This result in reduced system throughput with the use of multiple transceivers for providing one data stream. As depicted in FIG. 13, Hub 1301 forms four narrow beams 1311-1314 applied with a single codebook. When STA 1302 becomes vibrating, a wider beam 1320 is constructed by aggregating two neighboring narrow beams 1312 and 1313 to communicate with STA 1302.

To adapt between wide beam and narrow beam, Hub needs both narrow beam CSI and wide beam CSI. For example, station aggregates multiple narrow beam channels to acquired wide beam channel response, and thus derive wide beam CSI. In the example of FIG. 13, the channel response for narrow beam 1312 is h1, the channel response for narrow beam 1313 is h2, and the channel response for wide beam 1320 is h1+h2. To adapt from narrow beam to wide beam, the following can be observed: 1) decreased coherence on consecutively received narrow beam CSIs; and 2) when channel varies faster than CSI report periodicity, failed transmissions (NACK) increase. To adapt from wide beam to narrow beam, the following can be observed: 1) increased coherence on consecutively received narrow beam CSIs; and 2) narrow beam CQI value is larger than wide beam CQI value.

Figure 14:
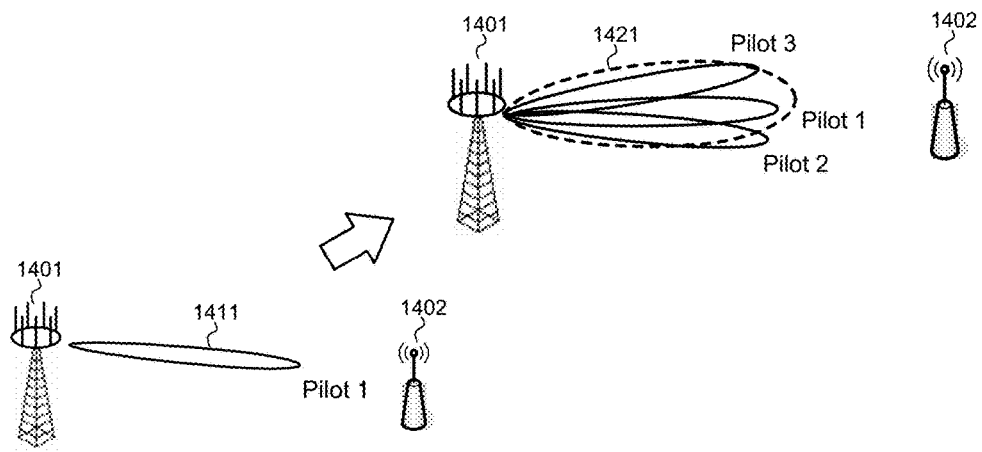
FIG. 14 illustrates an example of pilot support and CSI-report support for narrow and wide beam mode under station-aware single codebook approach.

FIG. 14 illustrates an example of pilot support and CSI-report support for narrow and wide beam mode under station-aware single codebook approach. For station-aware, pilots on the multiple narrow beams are of different sequences. Data, however, is the same in the to-be-aggregated narrow beams. Station needs to know which narrow beams to aggregate for acquiring the composite CSI and to perform composite channel estimation, and needs signaling to support such indication. In the example of FIG. 14, additional pilots are configured to have wide beam CSI capability. Initially, pilot 1 is configured for narrow beam 1411 by Hub 1401. Later, new pilots are added for the new beams used for wide beam composition. For example, pilot 1, pilot 2 and pilot 3 of wide beam 1421 are transmitted at the same time from Hub 1401 to STA 1402, but not in TDM fashion. The CSI report for narrow beam mode is the same as narrow beam CSI, while the CSI report for wide beam mode includes both narrow beam CSI reporting and wide beam CSI reporting.

Figure 15:
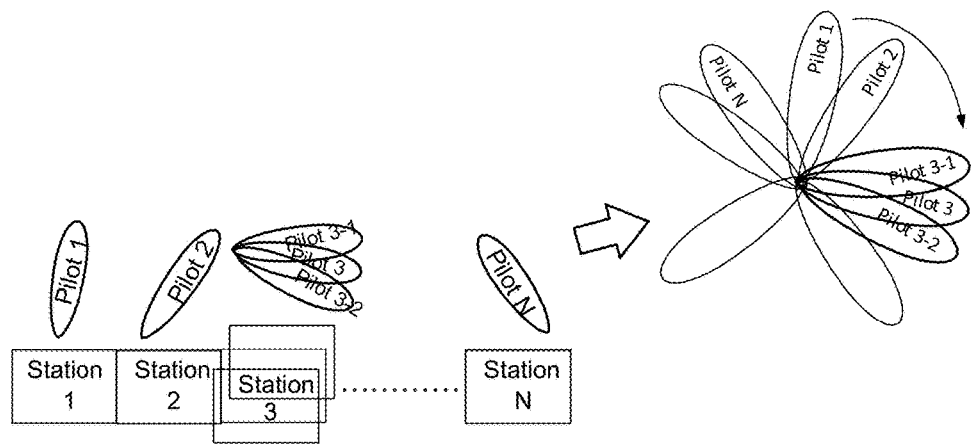
FIG. 15 illustrates an example of additional signaling and station behavior for supporting wide beam mode under station-aware single code book approach.

FIG. 15 illustrates an example of additional signaling and station behavior for supporting wide beam mode under station-aware single codebook approach. First, signaling is required to configure narrow beams to be aggregated. Station behavior is for composing, e.g., wide beam, wide channel estimation etc. Second, signaling is required to configure additional pilots on additional narrow beams. Station action is for changing pilot measurement pattern, the aggregated beams are SDM, not TDM. Third, signaling is required to configure additional wide beam CSI report. Station action is for reporting wide beam CSI in a repeatedly manner. As depicted in FIG. 15, Station 3 is configured to aggregate three narrow beams with pilots 3-1, 3, and 3-2 together. The narrow beams are transmitted using SDM, not TDM. Station 3 will report both narrow beam CSI and wide beam CSI to Hub.

Figure 16:
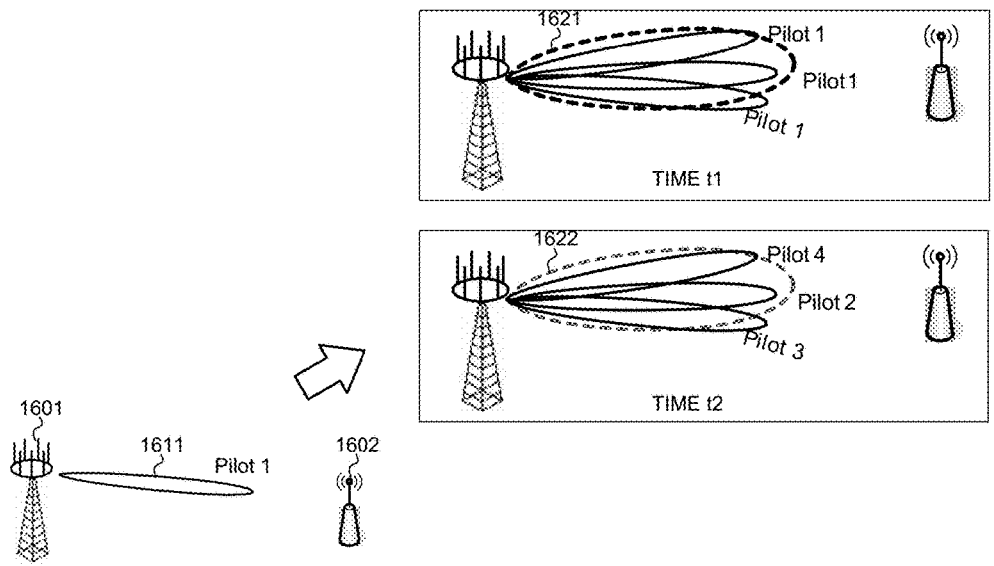
FIG. 16 illustrates an example of pilot support and CSI-report support for narrow and wider beam mode under station-agnostic single code book approach.

FIG. 16 illustrates an example of pilot support and CSI-report support for narrow and wider beam mode under station-agnostic single code book approach. For station-agnostic, pilots on the multiple narrow beams are the same sequence. Data is anyway the same in the to-be-aggregated narrow beams. Station aggregates narrow beams without knowing it. A station cannot tell how many narrow beams share the same pilot sequence, and no signaling is needed to support such aggregation indication. To adapt between wide beam and narrow beam, Hub needs both narrow beam CSI and wide beam CSI. Once Hub has decided to transmit with wide beam (i.e., multiple narrow beams), a station automatically monitors and reports wide beam CSI without knowing it. Hub only needs to signal to re-configure pilots that the station needs to monitor.

In the example of FIG. 16, initially, pilot 1 is configured for narrow beam 1611 by Hub 1601. Later, wide beam pilot transmission is station-transparent. Distinct pilots may be transmitted on aggregated narrow beam additionally. In one example, at time t1, the same pilot 1 is transmitted on narrow beams to form wide beam 1621. At time t2, distinct pilot 2, pilot 3 and pilot 4 are transmitted on aggregated narrow beams as well. The CSI report for narrow beam mode is the same as narrow beam CSI, while the CSI report for wide beam mode includes both narrow beam CSI reporting and wide beam CSI reporting station agnostically.

Figure 17:
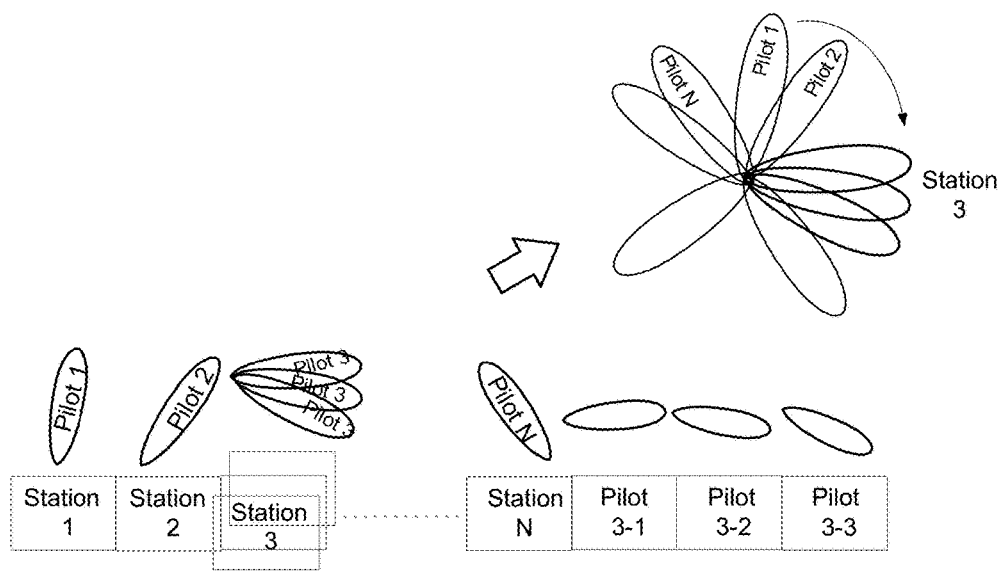
FIG. 17 illustrates an example of additional signaling and station behavior for supporting wide beam mode under station-agnostic single code book approach.

FIG. 17 illustrates an example of additional signaling and station behavior under station-agnostic single code book approach. There is no signaling requirement to configure narrow beams to be aggregated. Signaling is required to configure additional wide beam CSI report. Since it is station-transparent, there is no station action. Optionally, signaling is required to configure distinct pilots on aggregated narrow beams, in addition to the wide beam pilot. Station action is for changing pilot measurement pattern. As depicted in FIG. 17, Station 3 is configured to monitor pilot 3 over aggregated narrow beams and report wide beam CSI. In addition, Station 3 is also configured to monitor distinct pilots of Pilot 3-1, Pilot 3-2, and Pilot 3-3 over each of the narrow beams and report narrow beam CSI.

Figure 18:
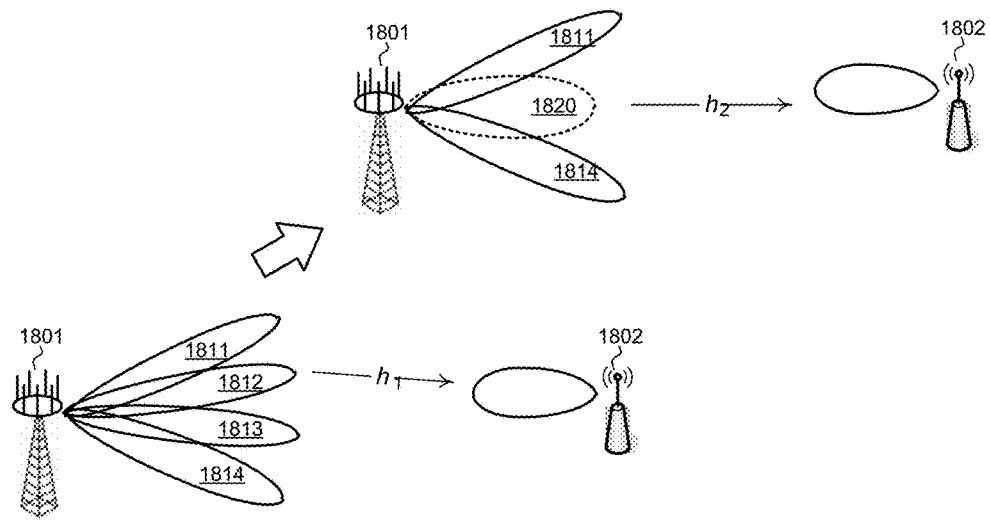
FIG. 18 illustrates double codebook approach for analog beamformers where two codebooks are used for different beam resolution.

FIG. 18 illustrates double codebook approach for analog beamformers where two codebooks are used for different beam resolution. Under double codebook design, analog beamformers are applied with two codebooks for two different resolutions of beam. Wider beamwidth is constructed by one codebook for coarse resolution, and narrower beamwidth is constructed by another codebook for fine resolution. Individual data streams can choose to be served by coarse beam or fine beam. Only one transceiver is needed for going through either coarse beam or fine beam. System throughput is maintained at the cost of additional codebook definition. As depicted in FIG. 18, Hub 1801 forms four narrow beams 1811-1814 applied with a first codebook for narrow beamwidth. When STA 1802 becomes vibrating, Hub 1801 forms two narrow beams 1811 and 1814 applied with the first codebook, and forms wide beam 1820 applied with a second codebook for wide beamwidth to communicate with STA 1802.

Beamwidth adaptation can be achieved by switching between wider and narrower beams. To adapt between wide beam and narrow beam, Hub needs both narrow beam CSI and wide beam CSI. The narrow beam CSI and wide beam CSI estimation opportunities need to be configured. In the example of FIG. 18, the channel response for narrow beam 1812 is h1, and the channel response for wide beam 1320 is h2. To adapt from narrow beam to wide beam, the following can be observed: 1) decreased coherence on consecutively received narrow beam CSIs; 2) when channel varies faster than CSI report periodicity, failed transmissions (NACK) increase; and 3) wide beam CSI value is larger than narrow beam CSI value. To adapt from wide beam to narrow beam, the following can be observed: 1) increased coherence on consecutively received narrow beam CSIs; and 2) narrow beam CSI is larger than wide beam CSI.

Figure 19:
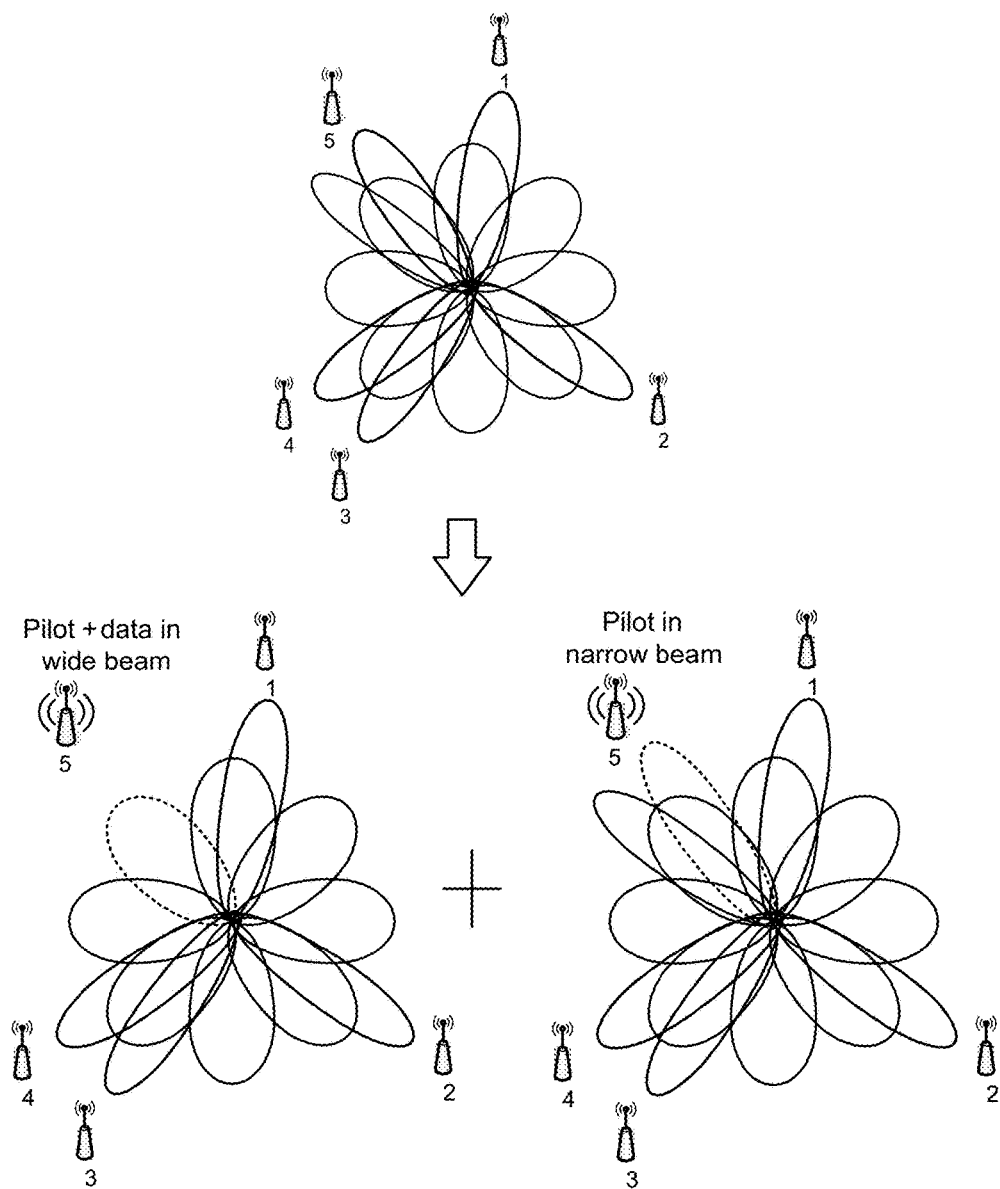
FIG. 19 illustrates additional signaling for supporting narrow and wide beam mode under double codebook approach.

FIG. 19 illustrates additional signaling for supporting narrow and wide beam mode under double codebook approach. Additional signaling is needed for supporting wide beam mode. First, signaling is required to configure narrow/wide beam pilots and its CSI report. Second, Station is not aware of narrow/wide beams, except different CSI reporting periodicity and criteria. Third, beam adaptation signaling is required. Beamwidth adaptation at Hub appears as beam adaptation. It is likely that Station beam remains. In this case, it could be entirely station transparent. As depicted in FIG. 19, Station 5 is configured with both narrow beam and wide beam pilots and their corresponding CSI reporting. Hub determines when to adapt between different beams accordingly.

Efficient State Transition

Figure 20:
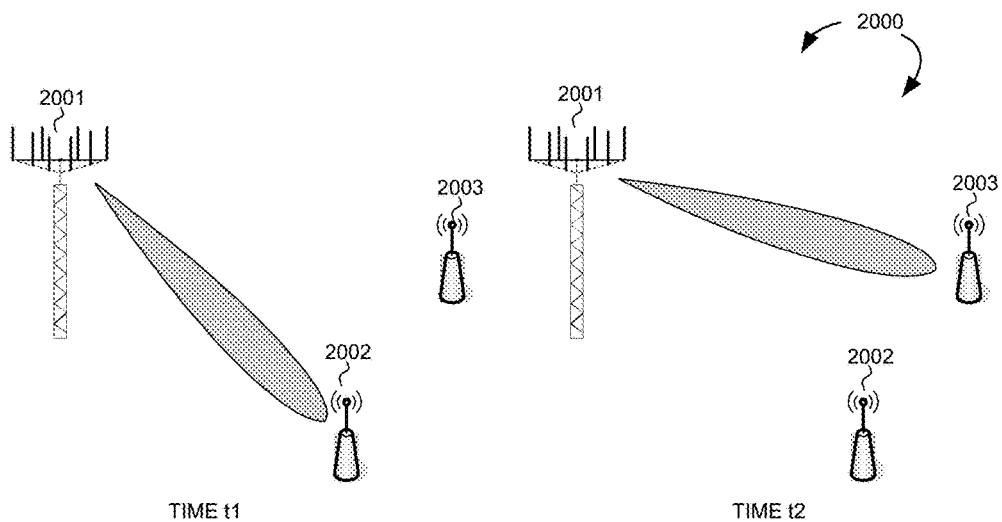
FIG. 20 illustrates a beamforming Millimeter Wave (mmWave) wireless communication system with efficient state transition in accordance with one novel aspect.

FIG. 20 illustrates a beamforming Millimeter Wave (mmWave) wireless communication system 2000 with efficient state transition in accordance with one novel aspect. In mmWave backhaul environment, static stations render the importance of mobility support. For wireless communication systems with high directivity transmission, e.g., mmWave system, FDM among users may not be possible. Due to narrow beam nature, users with similar spatial signature is not a usual case. Users are more often served in TDM manner with whole BW. Small packet transmission is thus extremely inefficient. As depicted in FIG. 20, STA 2002 is served by Hub 2001 at time t1 while STA 2003 is served by Hub 2001 at time t2 with whole BW.

For power and resource saving, it is sensible to deactivate STA's backhaul link whenever possible. With the existing RAN mechanism, STA switching between radio resource control (RRC) Idle and Connected states for power and resource saving. However, such transition is time and resource consuming, from the perspective of high-directivity transmission, e.g., mmWave system. First, contention-based random access may include conflict resolution. Second, establishing RRC connection requires several rounds of signaling between Hub and STA. Third, each transmission is provided with whole BW.

In accordance with one novel aspect, a mechanism to activate/deactivate STA backhaul link efficiently is proposed. Note that this is different from initial network entry of STAs. Initial network entry is related to initial beam pair establishment, which can take longer time without obvious harm since it happens only once during lifetime cycle. On the other hand, the activation/deactivation of STAs keeps STAs in connected state after network entry, with newly introduced states of activated state and deactivated state, both in Connected mode. Deterministic random access is used for deactivate to activate state transition. Periodic keep alive message in deterministic random access is used to take care of exceptional cases.

Both activated state and deactivated state are sub-states in Connected mode. Activated state follows similar behavior as LTE RRC connected mode. Deactivated state ceases dedicated transmission, but keeps STA context to allow fast deactivated-to-activated state transition. In deactivated state, dedicated DL/UL transmission is not expected, and dedicated DL/UL physical resources are released. STA context is kept to reduce the latency of deactivated to activated state transition. STA context is defined to include identities (e.g., higher layer ID), STA security configuration, and STA capability information. Lower layer ID can be kept as well.

Under deactivated state, no dedicated transmission is expected, i.e., no physical downlink control channel and data channel are allocated. Dedicated physical resources are released, no periodic uplink control channel and data channel are allocated for CSI report. However, STA physical ID is kept. Dedicated RRC configurations are mostly released including MAC configurations and RRC measurement configurations. MAC layer timers are deactivated or set to infinite before entering deactivated state. It is up to STA for monitoring camped Hub. Some bearers are kept as default including signaling bearer and default data bearer. Dedicated physical configuration related to group-based control such as TPC control is released. Dedicated physical configuration resulting in UL transmission is also released. STA context is kept at Hub.

Figure 21:
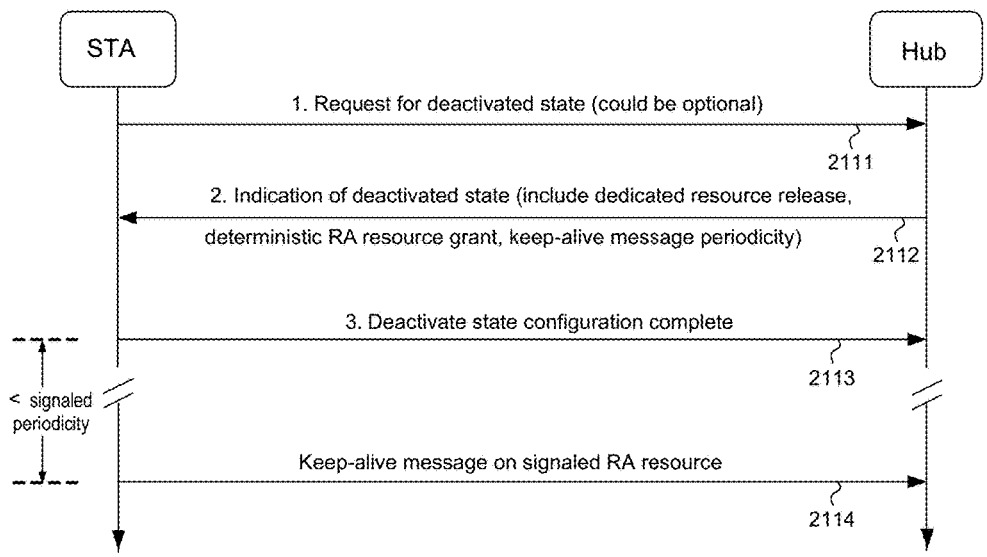
FIG. 21 illustrates one embodiment of transition from activated to deactivated state.

FIG. 21 illustrates one embodiment of transition from activated state to deactivated state. If STA is in activated state with dedicated channel allocation, STA is able to perform bi-directional data transmission. The objective is that STA would be able to enter deactivated state for power/resource saving. For example, STA can request to enter deactivated state. Alternatively, Hub would be able to indicate STA to enter deactivated state. For example, Hub indicates to release dedicated physical resources and assigns deterministic random access resource. The indication also includes keep-alive message periodically, which reconfigures STA to suit deactivate state. Upon entering deactivated state, Hub and STA still keep STA context. STA repeatedly sends keep-alive message in the dedicated RA resource.

In step 2111, the STA sends a request to enter deactivated state. This step could be optional. In step 2112, the Hub sends an indication for STA to enter deactivated state. The indication includes dedicated resource release, deterministic RA resource grant, and keep-alive message periodicity. RA resource includes preamble and physical resource for preamble transmission. The deterministic RA resource indicates a unique combination of preamble and random access channel. It could be a unique preamble and random access resource selection from a pool. It could also be a non-unique preamble and random access resource selection from a confined set, but when combined, the RA resource becomes unique. The uniqueness is from the point of view of the Hub scheduler. In step 2113, the STA sends a deactivate state configuration complete message to the Hub. Upon the signaled keep-alive message periodicity is reached, the STA repeatedly sends keep-alive message to the Hub in the dedicated RA resource.

Figure 22:
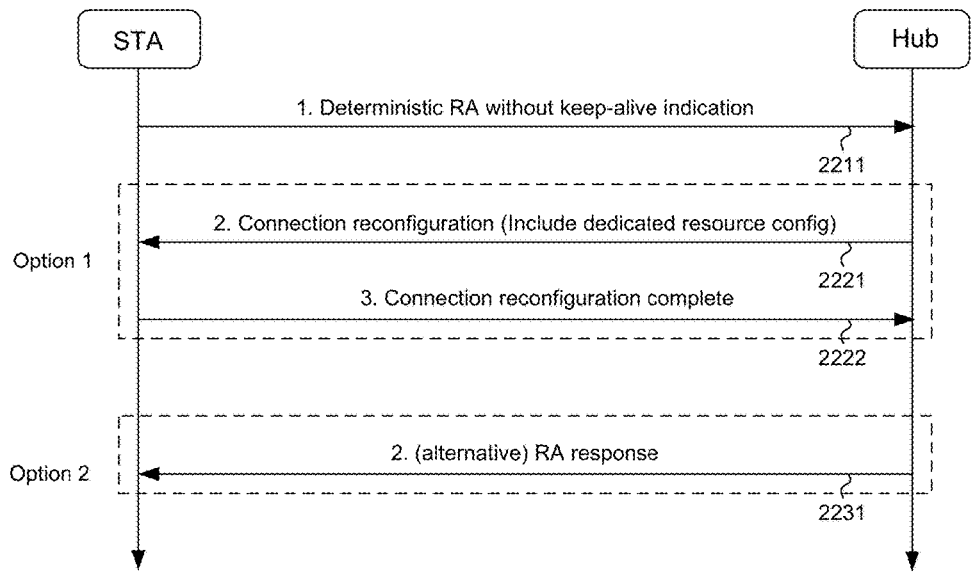
FIG. 22 illustrates one embodiment of transition from deactivated to activated state that is initiated by STA (uplink).

FIG. 22 illustrates one embodiment of transition from deactivated to activated state that is initiated by STA (uplink). The STA is in activated state. In step 2211, the STA sends deterministic RA without keep-alive indication. In a first option, in step 2221, the STA receives a connection reconfiguration message from the Hub, which includes dedicated resource configuration. In step 2222, the STA sends a connection reconfiguration complete message to the Hub and enters activated state. Note that previous CQI can be used as reference for MCS/power control. This procedure is similar to LTE contention-free random access. Since the STA is already in Connected state, only connection reconfiguration is needed. Security does not need to be re-established. As compared to traditional Msg2, the reconfiguration message is relatively big (implied RAR). The STA behavior change: STA monitors C-RNTI instead of RA-RNTI. In a second option, in step 2231, the STA receives a random-access response from the Hub. The STA accepts RA Response PDU to confirm RA reception at the Hub. Certain default RRC configuration upon recovery from deactivated state can be given before entering deactivated state. The STA behavior changes: STA need to monitor both RA-RNTI and C-RNTI by only one may happen.

Figure 23:
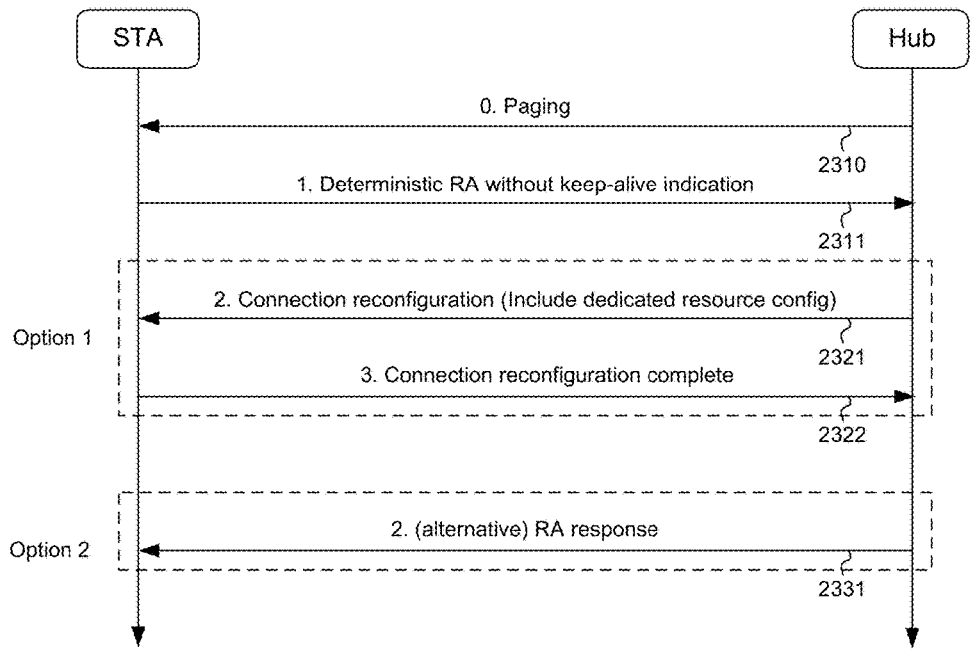
FIG. 23 illustrates one embodiment of transition from deactivated to activated state that is initiated by Hub (downlink).

FIG. 23 illustrates one embodiment of transition from deactivated to activated state that is initiated by Hub (downlink). This embodiment is similar to the embodiment illustrated in FIG. 22. Since the transition is initiated by the Hub, there is one extra step 2310, where the STA receives paging from the Hub, and then starts deterministic RA without keep-alive indication.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

performing measurements by a wireless station (STA) over a first set of pilots (Set-A pilots) associated with a first set of beams from a Hub in a directional transmission system, wherein the Set-A pilots has a first periodicity and provides full coverage;

reporting a first channel state information (CSI-1) to the Hub based on Set-A pilot measurements and CSI-1 configuration;

performing measurements by the STA over a second set of pilots (Set-B pilots) associated with a second set of beams, wherein the Set-B pilots has a second periodicity and provides partial coverage, wherein the Set-B pilots is determined based on CSI-1 reporting, and wherein the first periodicity is longer than the second periodicity; and reporting a second CSI (CSI-2) to the Hub based on Set-B pilot measurements and CSI-2 configuration.

2. The method of claim 1, wherein the STA derives a profile matrix based on the Set-A pilot measurements for signal strength of all TX and RX beam combinations.

3. The method of claim 2, wherein CSI-1 comprises beam combination elements selected from the profile matrix based on signal strength.

4. The method of claim 1, wherein the Set-B pilots comprises neighboring TX beams of the selected beam combination elements based on CSI-1.

5. The method of claim 1, wherein the STA derives a profile sub-matrix based on the Set-B pilot measurements.

6. The method of claim 5, wherein CSI-2 comprises beam combination elements selected from the profile sub-matrix based on signal strength.

7. The method of claim 1, wherein the STA receives Set-B pilot patterns, STA beams, and CSI reporting configurations over a dedicated channel.

8. The method of claim 1, wherein the Hub transmits Set-B pilot patterns, STA beams, and CSI reporting configurations over a dedicated channel to the STA.

9. A wireless station (STA), comprising:

a beam monitor that performs measurements over a first set of pilots (Set-A pilots) associated with a first set of beams from a Hub in a directional transmission system, wherein the Set-A pilots has a first periodicity and provides full coverage, wherein the beam monitor also performs measurements over a second set of pilots (Set-B pilots) associated with a second set of beams, wherein the Set-B pilots has a second periodicity and provides partial coverage, and wherein the first periodicity is longer than the second periodicity; and a transmitter that transmits a first channel state information (CSI-1) to the Hub based on Set-A pilot measurements and CSI-1 configuration, wherein the Set-B pilots is determined based on CSI-1 reporting, and wherein the transmitter also transmits a second CSI (CSI-2) to the Hub based on Set-B pilot measurements and CSI-2 configuration.

10. The STA of claim 9, wherein the STA derives a profile matrix based on the Set-A pilot measurements for signal strength of all TX and RX beam combinations.

11. The STA of claim 10, wherein CSI-1 comprises beam combination elements selected from the profile matrix based on signal strength.

12. The STA of claim 9, wherein the Set-B pilots comprises neighboring TX beams of the selected beam combination elements based on CSI-1.

13. The STA of claim 9, wherein the STA derives a profile sub-matrix based on the Set-B pilot measurements.

14. The STA of claim 13, wherein CSI-2 comprises beam combination elements selected from the profile sub-matrix based on signal strength.

15. The STA of claim 9, wherein the STA receives Set-B pilot patterns, STA beams, and CSI reporting configurations over a dedicated channel.

16. A method, comprising:

transmitting a first set of pilots (Set-A pilots) associated with a first set of beams from a Hub to a wireless station (STA) in a directional transmission system, wherein the Set-A pilots has a first periodicity and provides full coverage;

receiving a first channel state information (CSI-1) from the STA based on Set-A pilot measurements and CSI-1 configuration;

transmitting a second set of pilots (Set-B pilots) associated with a second set of beams from the Hub to the STA, wherein the Set-B pilots has a second periodicity and provides partial coverage, wherein the Set-B pilots is determined based on CSI-1 reporting, and wherein the first periodicity is longer than the second periodicity; and receiving a second CSI (CSI-2) from the STA based on Set-B pilot measurements and CSI-2 configuration.

17. The method of claim 16, wherein a profile matrix is derived based on the Set-A pilot measurements for signal strength of all TX and RX beam combinations.

18. The method of claim 17, wherein CSI-1 comprises beam combination elements selected from the profile matrix based on signal strength.

19. The method of claim 16, wherein the Set-B pilots comprises neighboring TX beams of the selected beam combination elements based on CSI-1.

20. The method of claim 16, wherein a profile sub-matrix is derived based on the Set-B pilot measurements.

21. The method of claim 20, wherein CSI-2 comprises beam combination elements selected from the profile sub-matrix based on signal strength.

22. The method of claim 16, wherein the Hub transmits Set-B pilot patterns over a broadcast channel to a plurality of STAs.

* * * * *